US008902848B2

(12) United States Patent
Sun et al.

(10) Patent No.: US 8,902,848 B2
(45) Date of Patent: *Dec. 2, 2014

(54) METHOD AND APPARATUS FOR PROCESSING DATA SENDING, AND METHOD AND APPARATUS FOR PROCESSING DATA RECEIVING

(75) Inventors: Weijun Sun, Kista (SE); Yongxing Zhou, Beijing (CN); Yang Li, Beijing (CN); Bingyu Qu, RollingMeadows, IL (US); Lei Wan, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 454 days.

This patent is subject to a terminal disclaimer.

(21) Appl. No.: 13/282,971

(22) Filed: Oct. 27, 2011

(65) Prior Publication Data

US 2012/0044902 A1 Feb. 23, 2012

Related U.S. Application Data

(63) Continuation of application No. PCT/CN2010/072030, filed on Apr. 22, 2010.

(30) Foreign Application Priority Data

Apr. 28, 2009 (WO) .................. PCT/CN2009/071537
Dec. 31, 2009 (CN) .......................... 2009 1 0215289

(51) Int. Cl.
H04W 4/00 (2009.01)
H04J 4/00 (2006.01)
H04W 72/00 (2009.01)
H04L 5/00 (2006.01)
H04L 25/02 (2006.01)

(52) U.S. Cl.
CPC ............ H04L 5/0023 (2013.01); H04L 5/0048 (2013.01); H04L 5/0094 (2013.01); H04L 25/0204 (2013.01); H04L 25/0226 (2013.01)
USPC ............ 370/330; 370/436; 370/478; 455/450

(58) Field of Classification Search
CPC ..... H04W 72/04; H04W 88/08; H04W 76/00; H04L 5/0023; H04L 5/005; H04L 5/00051; H04L 5/0048; H04L 5/0094; H04L 25/0204; H04L 25/0208; H04L 25/0226; H04L 27/26; H04L 27/2613; H04L 27/3455
USPC ......... 370/310–350, 427–429, 431, 436–437, 370/441–442, 478–480; 375/219, 260, 267, 375/295, 299, 347–349; 455/450–452.2, 455/464, 501, 509
See application file for complete search history.

(56) References Cited

U.S. PATENT DOCUMENTS 7,298,805 B2 * 11/2007 Walton et al. .................. 375/347
RE40,254 E 4/2008 Nikula et al.
(Continued)

FOREIGN PATENT DOCUMENTS

CN 1464667 A 12/2003
CN 1534897 A 10/2004
(Continued)

OTHER PUBLICATIONS

Chinese Office Action mailed Feb. 25, 2013 for corresponding Chinese Application No. 200980124741.8.
(Continued)

Primary Examiner — Tri H Phan
(74) Attorney, Agent, or Firm — Staas & Halsey LLP

(57) ABSTRACT

The present invention discloses a method and an apparatus for processing data sending and a method and an apparatus for processing data receiving, wherein, the method for processing data sending includes: allocating the number of spatial transmission layers and a pilot resource for transmission at each spatial transmission layer; generating pilot resource information according to the number of spatial transmission layers and the pilot resource for transmission at each spatial transmission layer; and sending the pilot resource information to user equipment (UE). According to the embodiments of the present invention, the UE is enabled to determine a specific pilot resource to be used so as to effectively distinguish between user channels, obtain a correct channel estimation value, improve channel estimation performance, and thus, obtain correct service data.

21 Claims, 8 Drawing Sheets

(56) References Cited

U.S. PATENT DOCUMENTS

| | | | |
|---|---|---|---|
| 7,826,489 B2* | 11/2010 | Buidanu et al. | 370/500 |
| 7,889,758 B2* | 2/2011 | Li et al. | 370/464 |
| 8,165,018 B2* | 4/2012 | Jia et al. | 370/229 |
| 8,243,678 B2* | 8/2012 | Cudak et al. | 370/330 |
| 8,320,301 B2* | 11/2012 | Walton et al. | 370/328 |
| 8,363,633 B2* | 1/2013 | Ko et al. | 370/343 |
| 8,488,694 B2* | 7/2013 | Wu et al. | 375/260 |
| 8,593,976 B2 | 11/2013 | Kishigami et al. | |
| 8,619,620 B2 | 12/2013 | Medvedev et al. | |
| 8,665,811 B2 | 3/2014 | Nory et al. | |
| 2005/0180449 A1 | 8/2005 | Ranta-Aho et al. | |
| 2007/0147536 A1* | 6/2007 | Melzer et al. | 375/267 |
| 2008/0212701 A1 | 9/2008 | Pan et al. | |
| 2008/0212702 A1 | 9/2008 | Pan et al. | |
| 2008/0285488 A1* | 11/2008 | Walton et al. | 370/280 |
| 2009/0215399 A1* | 8/2009 | Majonen | 455/67.11 |
| 2010/0085866 A1* | 4/2010 | Li et al. | 370/208 |
| 2010/0272032 A1* | 10/2010 | Sayana et al. | 370/329 |
| 2011/0019605 A1* | 1/2011 | Ma et al. | 370/312 |
| 2012/0044902 A1 | 2/2012 | Sun et al. | |
| 2012/0269295 A9* | 10/2012 | Ko et al. | 375/299 |
| 2013/0044727 A1* | 2/2013 | Nory et al. | 370/330 |

FOREIGN PATENT DOCUMENTS

| | | |
|---|---|---|
| CN | 1842176 A | 10/2006 |
| CN | 1889554 A | 1/2007 |
| CN | 101227249 A | 7/2008 |
| CN | 101242214 A | 8/2008 |
| CN | 101370240 A | 2/2009 |
| WO | WO 2007/098456 A2 | 8/2007 |
| WO | WO 2008/061045 A2 | 5/2008 |
| WO | WO 2008/103317 A2 | 8/2008 |
| WO | WO 2009026768 A1 | 3/2009 |
| WO | WO 2010/124456 A1 | 4/2009 |

OTHER PUBLICATIONS

Chinese Office Action mailed Jul. 13, 2012 for corresponding Chinese Application No. 200980124741.8.
Written Opinion of the International Searching Authority (translation) dated (mailed) Feb. 4, 2010, issued in Application No. PCT/CN2009/071537, filed Apr. 28, 2009, Huawei Technologies Co., Ltd.
3GPP TSG RAN WG1, Control Signalling Aspects of MU-MIMO, Athens, Greece, Aug. 2007.
International Search Report for International Application No. PCT/CN2010/072030, mailed Jul. 29, 2010 Huawei Technologies Co., Ltd.
International Search Report for International Application No. PCT/CN2009/071537, mailed Feb. 4, 2010, Huawei Technologies Co., Ltd.
Written Opinion of the International Searching Authority (translation) dated (mailed) Jul. 29, 2010, issued in Application No. PCT/CN2010/072030, filed Apr. 22, 2010, Huawei Technologies Co., Ltd.
Extended European Search Report mailed Jun. 6, 2012, issued in related European Application No. 10769270.9, Huawei Technologies Co., Ltd. (17 pages).
Alcatel-Lucent et al., "Support Multi-Layer Beamforming in LTE", 3GPP Draft; R1-091474 MultilayerBF, $3^{rd}$ Generation Partnership Project (3GPP), Mobile Competence Centre, Sophia-Antipolis Cedex, France, Mar. 18, 2009.
Motorola, "Controlling Signaling for Enhanced DL Transmission for LTE", R1-091339 Control for Enhanced DL with Change Tracking, $3^{rd}$ Generation Partnership Project (3GPP), Mobile Competence Centre, Sophia-Antipolis Cedex, France, Mar. 18, 2009.
Nokia, "UE-Specific Reference Symbol Multiplexing for LTE-Advanced Downlink", 3GPP Draft; R1-091352, $3^{rd}$ Generation Partnership Project (3GPP), Mobile Competence Centre, Sophia-Antipolis Cedex, France, Mar. 18, 2009.
Research in Motion et al., "Further Discussion on Signaling of DM-RS Port for LTE-A MIMO Transmission", 3GPP Draft; R1-094457 (RIM-Signaling DM-RS-Ports for LTE-A MIMO), $3^{rd}$ Generation Partnership Project (3GPP), Mobile Competence Centre, Sophia-Antipolis Cedex, France, Nov. 9, 2009.
Sun, Yong, "Proposed Text of MIMO for the IEEE 802.16m Amendment", IEEE Draft; C80216M-09_0513R2, vol. 802.16m, IEEE-SA, Piscataway, NJ, USA, Mar. 11, 2009.
Extended European Search Report dated (mailed) Mar. 19, 2012, issued in related Application No. 09843868.2-2415 / 2413556 PCT/2009071537, Huawei Technologies Co., Ltd.
Philips, 3GPP TSG RAN WG1 Meeting #48bis, "Performance of LTE DL MU-MIMO with dedicated pilots", Tdoc R1-071403, St. Julian's, Malta, pp. 1-5, (Mar. 2007).
Qualcomm Europe, 3GPP TSG-RAN WG1 #44, "Overview of DL Spatial Multiplexing Schemes for E-UTRA", R1-060454, Denver, USA, pp. 1-5, (Feb. 13-17, 2005).
Nokia, Nokia Siemens Networks, TSG RAN WG1 meeting #49bis, "LTE Multiuser MIMO and Interference Suppression in the UE", R1-072982, Orlando, Florida, pp. 1-3, (Jun. 25-29, 2007).
Freescale Semiconductor Inc., 3GPP TSG RAN WG1 #49, "Reference signaling for MU-MIMO", R1-072515, Kobe, Japan, pp. 1-4, (May 2007).
Office Action issued on Feb. 27, 2014 in copending U.S. Appl. No. 13/283,771.
Office Action issued on Jun. 2, 2014 in copending U.S. Appl. No. 13/283,771.
U.S. Appl. No. 13/283,771, filed Oct. 28, 2011, Weijun Sun et al., Huawei Technologies Co., Ltd.
Notice of Allowance issued on Oct. 3, 2014, in U.S. Appl. No. 13/283,771.

* cited by examiner

US 8,902,848 B2

METHOD AND APPARATUS FOR PROCESSING DATA SENDING, AND METHOD AND APPARATUS FOR PROCESSING DATA RECEIVING

CROSS-REFERENCE TO RELATED APPLICATIONS

This application is a continuation of International Application No. PCT/CN2010/072030, filed on Apr. 22, 2010, which claims priority to Chinese Patent Application No. PCT/CN2009/071537, filed on Apr. 28, 2009, and Chinese Patent Application No. 200910215289.8, filed on Dec. 31, 2009, all of which are hereby incorporated by reference in their entireties.

FIELD OF THE INVENTION

The present invention relates to a communication technology, and in particular, to a method and an apparatus for processing data sending and a method and an apparatus for processing data receiving.

BACKGROUND OF THE INVENTION

As specified in a Long Term Evolve (hereinafter referred to as LTE) protocol, a common pilot symbol may be used to obtain a channel estimation value needed for data demodulation. When the common pilot symbol is used to obtain the channel estimation value needed for data demodulation, an eNodeB first determines a precoding matrix used by user equipment (hereinafter referred to as UE), and notifies the UE of a precoding matrix index (hereinafter referred to as PMI) corresponding to the precoding matrix. The UE may obtain, according to a common pilot and PMI, the channel estimation value needed for data demodulation. In a Multiple User Multiple Input Multiple Output (hereinafter referred to as MU-MIMO) working mode, the eNodeB also needs to notify the UE of a power offset. The UE may obtain, according to the power offset, whether a matching UE exists currently, and then obtains, according to the common pilot, PMI, and power offset, the channel estimation value needed for MU-MIMO data demodulation.

When a dedicated pilot symbol is used to obtain the channel estimation value needed for data demodulation, a pilot symbol is combined with a data symbol together for transmission in a time division/frequency division multiplexing mode in a dedicated pilot channel. During data transmission, the eNodeB notifies the UE of the number of transmission layers used for data transmission. At a receiving end, after the UE receives a receiving signal, the UE obtains, according to the number of transmission layers and a pilot resource that is used for transmitting the pilot symbol and corresponds to each transmission layer, the channel estimation value needed for data demodulation, and performs corresponding data demodulation according to the channel estimation value to obtain service data. The eNodeB may notify the UE of a code word of the pilot resource corresponding to each transmission layer, or the eNodeB may preset the code word of the pilot resource corresponding to each transmission layer with the UE.

In a MU-MIMO transmission mode, channel estimation is performed according to the number of transmission layers only, which causes channel estimation performance to decrease or ever a data demodulation error.

SUMMARY OF THE INVENTION

Embodiments of the present invention provide a method and an apparatus for processing data sending and a method and an apparatus for processing data receiving, so as to obtain a correct channel estimation value in a MU-MIMO transmission mode.

An embodiment of the present invention provides a method for processing data sending, where the method includes:
  allocating the number of spatial transmission layers and a pilot resource for transmission at each spatial transmission layer to a UE;
  determining pilot resource information according to the number of spatial transmission layers and the pilot resource for transmission at each spatial transmission layer; and
  sending data information to the UE, where the data information includes the pilot resource information, so as to enable the UE to obtain a channel estimation value according to the pilot resource information.

An embodiment of the present invention provides a method for processing data receiving, where the method includes:
  receiving data information, where the data information includes pilot resource information of a UE;
  determining a pilot resource of the UE according to the pilot resource information;
  obtaining, according to the data information and the pilot resource, a channel estimation value of a channel used by the UE; and
  obtaining service data according to the data information and the channel estimation value.

An embodiment of the present invention provides an apparatus for processing data sending, where the apparatus includes:
  an allocating module, configured to allocate the number of spatial transmission layers and a pilot resource for transmission at each spatial transmission layer to a UE;
  a generating module, configured to determine pilot resource information according to the number of spatial transmission layers and the pilot resource for transmission at each spatial transmission layer; and
  a sending module, configured to send data information to the UE, where the data information includes the pilot resource information, so as to enable the UE to obtain a channel estimation value according to the pilot resource information.

An embodiment of the present invention provides an apparatus for processing data receiving, where the apparatus includes:
  a receiving module, configured to receive data information, where the data information includes pilot resource information of a UE;
  a pilot resource obtaining module, configured to determine a pilot resource of the UE according to the pilot resource information;
  a first obtaining module, configured to obtain, according to the data information and the pilot resource, a channel estimation value of a channel used by the UE; and
  a second obtaining module, configured to obtain service data according to the data information and the channel estimation value.

An embodiment of the present invention provides a communication system, including an eNodeB and a UE. The eNodeB is configured to allocate the number of spatial transmission layers and a pilot resource for transmission at each spatial transmission layer to the UE, generate pilot resource information according to the number of spatial transmission layers and the pilot resource for transmission at each spatial transmission layer, and send data information to the UE, where the data information includes the pilot resource information.

The UE is configured to receive the data information, determine a pilot resource of the UE according to the pilot resource information, obtain, according to the data information and the pilot resource, a channel estimation value of a channel used by the UE, and obtain service data according to the data information and the channel estimation value.

Based on the method and apparatus for processing data sending and the method and apparatus for processing data receiving that are provided in the foregoing embodiments of the present invention, the pilot resource information may be generated according to the number of spatial transmission layers and the pilot resource for transmission at each spatial transmission layer that are allocated to each UE, and sent to the UE. According to the pilot resource information, the UE may determine the specific pilot resource to be used so as to effectively distinguish between specific user channels, obtain the correct channel estimation value, improve channel estimation performance, and thus, obtain correct service data.

The technical solutions of the embodiments of the present invention are further described in detail through accompanying drawings and embodiments below.

DETAILED DESCRIPTION OF THE EMBODIMENTS

According to the embodiments of the present invention, pilot resource information is generated and sent to a UE so as to enable the UE to determine a specific pilot resource to be used according to the pilot resource information, effectively distinguish between specific user channels, obtain a correct channel estimation value, improve channel estimation performance, and thus, obtain correct service data.

Figure 1:
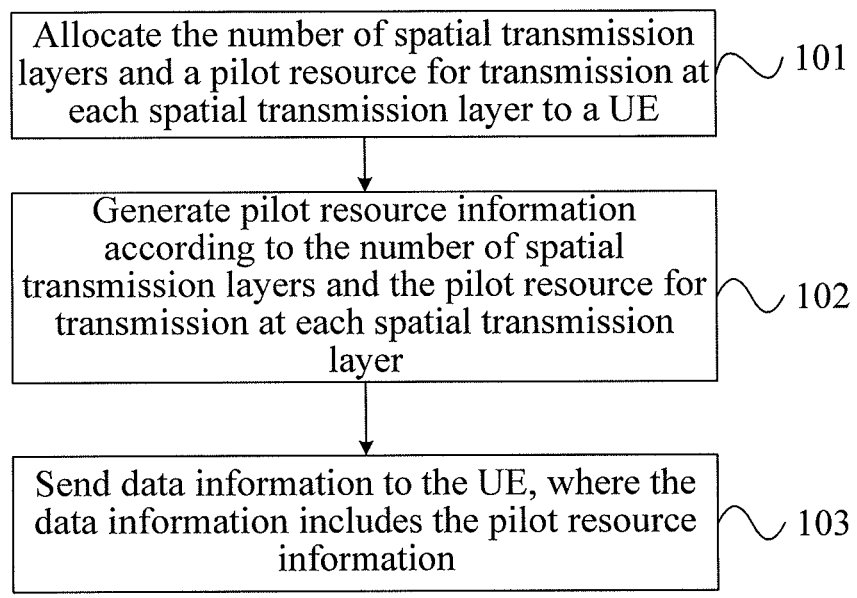
FIG. 1 is a flowchart of an embodiment of a method for processing data sending according to the present invention.

FIG. 1 is a flowchart of an embodiment of a method for processing data sending according to the present invention. This embodiment may specifically be implemented by an eNodeB.

As shown in FIG. 1, this embodiment includes the following steps:

Step 101: Allocate the number of spatial transmission layers and a pilot resource for transmission at each spatial transmission layer to a UE.

Step 102: Generate pilot resource information according to the number of spatial transmission layers and the pilot resource for transmission at each spatial transmission layer.

Specifically, according to an embodiment of the present invention, the pilot resource information includes a pilot resource of the UE for transmission at a first spatial transmission layer in each spatial transmission layer allocated to the UE and the number of spatial transmission layers allocated to the UE. The first spatial transmission layer may be a spatial transmission layer with the smallest number in each spatial transmission layer. Or, according to another embodiment of the present invention, the pilot resource information includes a pilot resource of the UE for transmission at each spatial transmission layer allocated to the UE. Or, according to another embodiment of the present invention, the pilot resource information includes the pilot resource of the UE for transmission at the first spatial transmission layer in each spatial transmission layer allocated to the UE. In addition, the pilot resource information in the embodiments of the present invention is not limited to the foregoing as long as the UE may determine, according to the pilot resource information, the pilot resource used by the UE.

In addition, according to another embodiment of the present invention, compared with the embodiment as shown in FIG. 1, the pilot resource information may further include a current pilot-resource use status of a communication system. The current pilot-resource use status specifies how many resource elements (hereinafter referred to as REs) are used in the communication system currently. According to how many parts of pilot resources exist in the communication system, and the number of REs included in each part of pilot resources, the UE may obtain possible pilot resource information of a matching UE, where the matching UE is a UE that uses a same time-frequency resource. According to the pilot resource information of the matching UE, a channel estimation value of the matching UE may be estimated. Thus, signal detection or interference suppression detection is performed, signal detection performance is improved, a RE of transmission service data is correctly obtained, and service data of the UE is correctly obtained from the RE of the transmission service data.

In addition, according to another embodiment of the present invention, compared with the embodiment as shown in FIG. 1, the pilot resource information may further include a use status of the pilot resource for transmission at each spatial transmission layer allocated to the UE. For example, for a code division multiplexing mode, the use status of the pilot resource may be a code word of the pilot resource, or for a code division and time/frequency division multiplexing mode, the use status of the pilot resource may be the code word of the pilot resource and an occupied time frequency position, so that the UE can obtain, according to the code word and the received data information, a channel estimation value of a channel used by the UE, and further obtain service data according to the channel estimation value.

Step 103: Send data information to the UE, where the data information includes the pilot resource information.

Figure 2:
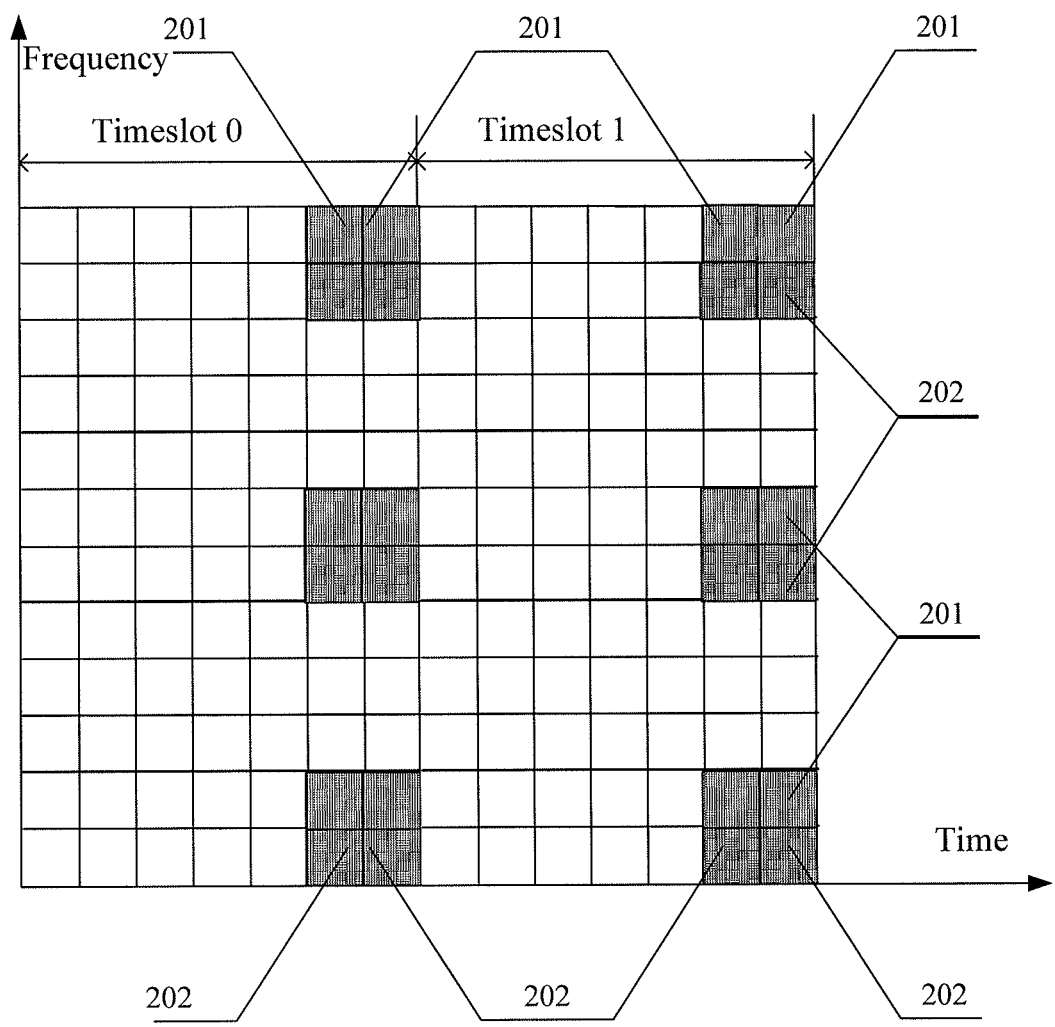
FIG. 2 is a schematic diagram of a time-frequency resource block.

FIG. 2 is a schematic diagram of a time-frequency resource block. The following takes an example that a time-frequency resource of the communication system is the time-frequency resource block as shown in FIG. 2, and describes the method for processing data sending according to the embodiment of the present invention. In FIG. 2, a sub-frame includes two timeslots: a timeslot 0 and a timeslot 1. In every timeslot, there are seven orthogonal frequency division multiplexing (hereinafter referred to as OFDM) symbols, and 12×7 REs in total. In the resource block as shown in FIG. 2, the following method may be used to allocate pilot resources: for a first RE 201, Code Division multiplexing (hereinafter referred to as CDM) is introduced in a time domain to provide four orthogonal pilot resources. For example, a 4×4 Walsh matrix is used and includes $c_1$, $c_2$, $c_3$, and $c_4$, where, $c_1$=[1,1,1,1], $c_2$=[1,-1,1,-1], $c_3$=[1,1,-1,-1], and $c_4$=[1,-1,-1,1]. The same method is applied, and for a second RE 202, the CDM is also introduced in the time domain to provide four orthogonal pilot resources. In this embodiment, the use status of the pilot resource for transmission at each spatial transmission layer allocated to the UE is specifically a code word that allocates the pilot resource to the UE. This code word may also be $c_1$=[1,0,1,0], $c_2$=[0,1,0,1], $c_3$=[1,0,-1,0], and $c_4$=[0,1,0,-1]. Or, a 4×4 DFT transform matrix is used and includes $c_1'$, $c_2'$, $c_3'$, and $c_4'$, where, $c_1'$=[1,1,1,1], $c_2'$=[1,-j,-1,j], $c_3'$=[1,-1,1,-1], and $c_4'$=[1,j,-1,-j]. An orthogonal code-word set whose length is 4 includes a code-word subset whose orthogonal cover code (OCC) length is 2. If a subset [1,1] of $c_1$ and a subset [1,-1] of $c_2$ are a pair of orthogonal code words, $c_1$ and $c_2$ are a pair of code words whose OCC length is 2. Similarly, $c_3$ and $c_4$ are a pair of code words whose OCC length is 2, and $c_2'$ and $c_4'$ are a pair of code words whose OCC length is 2. When orthogonal pilots of only two spatial transmission layers need to be transmitted on the same pilot resource RE, the code words whose OCC length is 2 may be selected from four orthogonal code words and allocated to the two spatial transmission layers, for example, $c_1$ and $c_2$, or $c_3$ and $c_4$, or $c_1'$ and $c_3'$, or $c_2'$ and $c_4'$. In this way, the pilots of the two spatial transmission layers in a timeslot are orthogonal, and the channel estimation performance may be improved in the case that the UE moves at a high speed.

During spatial multiplexing transmission, the communication system arranges the specific pilot resources that support spatial multiplexing transmission and are as shown in FIG. 2 in order. Suppose that: on the first RE 201, p1, p2, p5, and p6 are respectively used to identify pilot resources of the first spatial transmission layer, a second spatial transmission layer, a fifth spatial transmission layer, and a sixth spatial transmission layer, and the code words are $c_1$, $c_2$, $c_3$, and $c_4$ respectively; on the second RE 202, p3, p4, p7, and p8 are respectively used to identify the pilot resources of a third spatial transmission layer, a fourth spatial transmission layer, a seventh spatial transmission layer, and an eighth spatial transmission layer, and the code words are $c_1$, $c_2$, $c_3$, and $c_4$ respectively.

In a single user MIMO (hereinafter referred to as SU-MIMO) mode, the foregoing arranging order of the pilot resources is used. If the number of spatial transmission layers is equal to or smaller than 4, the pilot resources corresponding to p1 to p4 are selected in sequence according to the number of spatial transmission layers, which may provide a higher transmission throughput. However, in the MU-MIMO mode, matching UEs have a certain spatial isolation degree, and transmitted signals of the matching UEs have different directions in space.

Suppose that a first UE and second UE are matching UEs. The eNodeB allocates one spatial transmission layer and a pilot resource for transmission at the spatial transmission layer to the first UE. That is, the number of spatial transmission layers is 1, and the pilot resource for transmission at the first spatial transmission layer is p1. The eNodeB allocates two spatial transmission layers and a pilot resource for transmission at each spatial transmission layer to the second UE. That is, the number of spatial transmission layers is 2, and the pilot resource for transmission at the first spatial transmission layer is p3. The communication system uses 24 REs currently. The eNodeB generates pilot resource information according to the number of spatial transmission layers allocated to the first UE, the pilot resource for transmission at each spatial transmission layer allocated to the first UE, and the current pilot-resource use status of the communication system, and carries the pilot resource information in data information and sends the data information to the first UE. The eNodeB generates pilot resource information according to the number of spatial transmission layers allocated to the second UE, the pilot resource for transmission at each spatial transmission layer allocated to the second UE, and the current pilot-resource use status of the communication system, and carries the pilot resource information in data information and sends the data information to the second UE.

After obtaining the pilot resource information from the data information, the first UE may know, according to the pilot resource information in the data information, that the number of spatial transmission layers allocated to itself is 1, and that the pilot resource for transmission at the first spatial transmission layer is p1, and thus, may know that its pilot resource is p1. Further, the communication system uses 24 REs currently, that is, uses up the first RE 201 and second RE 202, so it may be known that the data transmission RE is an RE other than the first RE 201 and second RE 202 that are as shown in FIG. 2. Therefore, the first UE may correctly obtain the service data sent by the eNodeB to itself from the data transmission RE.

Similarly, after obtaining the pilot resource information from the data information, the second UE may know, according to the pilot resource information in the data information, that the number of spatial transmission layers allocated to itself is 2, and that the pilot resource for transmission at the first spatial transmission layer is p3, and thus, may know that its pilot resources are p3 and p4. Further, the communication system uses 24 REs currently, that is, uses up the first RE 201 and second RE 202, so it may be known that the data transmission RE is an RE other than the first RE 201 and second RE 202 that are as shown in FIG. 2. Therefore, the second UE may correctly obtain the service data sent by the eNodeB to itself from the data transmission RE.

In the MU-MIMO mode, the communication system may use only the same RE. For example, only the first RE 201 or second RE 202 is used, or both REs may be used at the same time. Therefore, in a MU-MIMO working mode, the eNodeB and UE may agree on the current pilot-resource use status or the eNodeB may notify the UE of the current pilot-resource use status. Multiple matching UEs have a certain spatial isolation degree. Therefore, when the number of matching UEs is equal to or smaller than 4, the maximum number of transmission layers for each UE is equal to or smaller than 2, and the total number of transmission layers of multiple matching UEs is equal to or smaller than 4, the communication system may consider which RE is used by the multiple matching UEs only. In this way, when notifying the UEs of the current pilot-resource use status, the eNodeB may not need to send the types of REs in use, which reduces the information transmission volume, and simplifies the amount of processing of the UEs on the information.

For example, if the eNodeB and UE agrees on using the first RE 201 in advance, in the foregoing example, the current pilot-resource use status of the communication system may not be carried in the pilot resource information. The number of spatial transmission layers allocated by the eNodeB to the first UE 1 is 1, and the pilot resource for transmission at the first spatial transmission layer is p1. The number of spatial transmission layers allocated by the eNodeB to the second UE 2 is 2, and the pilot resource for transmission at the first spatial transmission layer is p2. The eNodeB generates pilot resource information according to the number of spatial transmission layers allocated to the first UE and the pilot resource for transmission at each spatial transmission layer allocated to the first UE, and carries the pilot resource information in data information and sends the data information to the first UE. The eNodeB generates pilot resource information according to the number of spatial transmission layers allocated to the second UE and the pilot resource for transmission at each spatial transmission layer allocated to the second UE, and carries the pilot resource information in data information and sends the data information to the second UE. After obtaining the pilot resource information from the data information, the first UE may know, according to the pilot resource information in the data information, that the number of spatial transmission layers allocated to itself is 1, and that the pilot resource for transmission at the first spatial transmission layer is p1, and thus, may know that its pilot resource is p1. After obtaining the pilot resource information from the data information, the second UE may know, according to the pilot resource information in the data information, that the number of spatial transmission layers allocated to itself is 2, and that the pilot resource for transmission at the first spatial transmission layer is p2, and thus, may know that its pilot resources are p2 and p5. Further, the communication system agrees on using the first RE 201 in advance, so the data transmission RE is an RE other than the first RE 201 as shown in FIG. 2. Therefore, the first UE and the second UE may correctly obtain the service data sent by the eNodeB to itself from the data transmission RE respectively.

In addition, it may be further agreed that the UE uses a code division orthogonal pilot resource with a same pilot-resource overhead in SU-MIMO and MU-MIMO transmission modes in the case that the numbers of UE spatial transmission layers are the same. The pilot-resource overhead may be the number of REs used by the UE. The UE spatial transmission layer is a spatial transmission layer used at a UE side among the spatial transmission layers allocated by the eNodeB. For example, when the number of spatial transmission layers of the UE is equal to or smaller than 2, the first RE 201 pilot resource in FIG. 2 is used in the SU-MIMO and MU-MIMO modes; or, the first RE 201 pilot resource is used in the SU-MIMO mode and the second RE 202 pilot resource is used in MU-MIMO mode; or, the second RE 202 pilot resource is used in SU-MIMO mode and the first RE 201 pilot resource is used in MU-MIMO mode; or, the second RE 202 pilot resource is used in the SU-MIMO and MU-MIMO modes. The advantage of this agreement is as follows: When only part of resource blocks among the resource blocks occupied by the UE service data in the MU-MIMO mode use MU-MIMO transmission but other resource blocks use SU-MIMO transmission, and if the system pilot-resource overheads corresponding to the MU-MIMO and SU-MIMO are different, for example, the system pilot resources in the SU-MIMO are 12 REs of the first RE 201, and the system pilot resources in the MU-MIMO are 24 REs of the first RE 201 and second RE 202, the system can generate pilot resource information according to only the largest pilot-resource overhead to indicate that the system pilot-resource usage of the UE is the first RE 201 and second RE 202. However, the pilot resources of the second RE 202 are not used in the resource blocks in the SU-MIMO transmission actually. As a result, resources are wasted.

In an LTE+ communication system, in order to implement more flexible resource scheduling, the SU-MIMO and MU-MIMO may be dynamically switched according to channel conditions of the UE and system capacity requirements of the user. The NodeB may not need to notify the UE whether the current service data transmission is in the SU-MIMO or MU-MIMO. However, the UE may know whether the SU-MIMO or MU-MIMO mode is used currently through the current pilot resource information. According to the embodiment of the present invention, the pilot RE used by the system in the MU-MIMO mode may be agreed in advance. In addition, the pilot resource corresponding to the number of spatial transmission layers of the UE may be further agreed. According to these agreements, the information about the number of spatial transmission layers of the user, the pilot resource information used by each spatial transmission layer, and information about the pilot-resource use status of the system that are included in the pilot resource information are combined for joint signal source encoding, and thus an information bit overhead is reduced.

FIG. 2 is still taken as an example. On the first RE 201 resource, the Walsh code c1=[1,1,1,1], c2=[1,−1,1,−1], c3=[1,1,−1,−1], and c4=[1,−1,−1,1] may provide four code division orthogonal pilot resources numbered as P1, P2, P5, and P6. The same method is used, and for the second RE 202, four code division orthogonal pilot resources numbered as P3, P4, P7, and P8 are provided. Suppose that in the SU-MIMO transmission mode, the number of spatial transmission layers of the UE may be 1 to 8. It is agreed that: When the number of transmission layers of the UE is 1, the pilot resource P1 is used; when the number of transmission layers of the UE is 2, the pilot resources P1 and P2 are used; when the number of transmission layers of the UE is 3, the pilot resources P1, P2, and P3 are used; and the rest may be deduced by analogy. It is agreed that the unique pilot resource corresponds to the number of spatial transmission layers. In the SU-MIMO mode, the pilot resource used by the UE is the pilot resource sent by the system. Therefore, when the number of spatial transmission layers of the UE is equal to or smaller than 2, the pilot resource of the system may use an orthogonal code whose OCC length is 2. In the MU-MIMO transmission mode, the number of spatial transmission layers of the UE is equal to or smaller than 2, and the number of spatial transmission layers of the system after UE matching is equal to or smaller than 4. It is agreed that the pilot resource used in the MU-MIMO is the first RE 201. When the number of transmission layers of the UE is 1, the pilot resource P1, or P2, or P5, or P6 may be used. When the number of transmission layers of the UE is 2, the pilot resources P1 and P2, or P5 and P6 may be used. The UE does not know the total number of spatial transmission layers of the system in the MU-MIMO mode. Therefore, the pilot resources of the system include all orthogonal code words whose length is 4. According to the agreement, the number of transmission layers of the UE, pilot resource at each spatial transmission layer, and current pilot resources used by the communication system are combined and as shown in the following table. Each combination is identified as a pilot-resource information number. The pilot-resource information numbers 0 to 7 correspond to pilot resource allocation in the SU-MIMO mode, and pilot-resource information numbers 8 to 13 correspond to pilot resource allocation in the MU-MIMO mode. The NodeB allocates pilot resources to the UE according to the preset agreement and the transmission mode of the UE and the number of spatial transmission layers of the UE, and notifies the UE of the corresponding pilot-resource information numbers. In this way, the UE may know the number of spatial transmission layers, the pilot resource used by each transmission layer, and current pilot-resource use status of the system. In addition, the UE knows, according to the agreed pilot resources used in the SU-MIMO and MU-MIMO, whether another matching UE exists.

| Pilot-Resource Information Number | The Number of Spatial Transmission layers of the UE | Pilot Resource at Each Spatial Transmission Layer | Current Pilot-Resource Use status of the System | Spatial Transmission Status of the UE |
|---|---|---|---|---|
| 0 | 1 | P1 | RE 201, OCC = 2 | SU-MIMO |
| 1 | 2 | P1, P2 | RE 201, OCC = 2 | SU-MIMO |
| 2 | 3 | P1, P2, P3 | RE201RE 201, RE202RE 202, OCC = 2 | SU-MIMO |
| 3 | 4 | P1, P2, P3, P4 | RE 201, RE 202, OCC = 4 | SU-MIMO |
| 4 | 5 | P1, P2, P3, P4, P5 | RE 201, RE 202 OCC = 4 | SU-MIMO |
| 5 | 6 | P1, P2, P3, P4, P5, P6 | RE 201, RE 202 OCC = 4 | SU-MIMO |
| 6 | 7 | P1, P2, P3, P4, P5, P6, P7 | RE 201, RE 202 OCC = 4 | SU-MIMO |
| 7 | 8 | P1, P2, P3, P4, P5, P6, P7, P8 | RE 201, RE 202 OCC = 4 | SU-MIMO |
| 8 | 1 | P1 | RE 201, OCC = 4 | MU-MIMO |
| 9 | 1 | P2 | RE 201, OCC = 4 | MU-MIMO |
| 10 | 1 | P5 | RE 201, OCC = 4 | MU-MIMO |
| 11 | 1 | P6 | RE 201, OCC = 4 | MU-MIMO |
| 12 | 2 | P1, P2 | RE 201, OCC = 4 | MU-MIMO |
| 13 | 2 | P5, P6 | RE 201, OCC = 4 | MU-MIMO |

In the preceding table, the current pilot-resource use status of the system includes a position of the pilot resource RE and OCC length, where OCC=2 means that a code word is orthogonal in a slot while OCC=4 means that a code word is orthogonal in a sub-frame.

In addition, the MU-MIMO transmission when the number of spatial transmission layers of the system is 2 may be supported based on a code word whose OCC length is 2. That is, each of two users uses a layer of transmission space. In this case, a pilot combination corresponds to the MU-MIMO transmission mode may be further added in the preceding table, and the pilot combination whose pilot-resource information number is marked as 0 on the original table may be further used for the MU-MIMO transmission. The table changes as follows:

based on orthogonal pilot, the pilot combination corresponding to the SU-MIMO in the preceding table may be used to implement the MU-MIMO transmission through allocating different sequences of pilot scrambling codes for different users. But the UEs cannot obtain the channel of the matching UE through the pilot to perform interference suppression detection.

Combinations of the number of transmission layers of the UE, the pilot resource of each spatial transmission layer, and the current pilot resource used by the communication system are not limited to the combination manners in the foregoing two tables. The system may set a corresponding combination according to the pilot resource used in other transmission scenarios. For example, during data retransmission, in order to reduce processing complexity of retransmitted data, it is set

| Pilot-Resource Information Number | The Number of Spatial Transmission layers of the UE | Pilot Resource at Each Spatial Transmission Layer | Current Pilot-Resource Use status of the System | Spatial Transmission Status of the UE |
|---|---|---|---|---|
| 0 | 1 | P1 | RE 201, OCC = 2 | SU-MIMO or MU-MIMO |
| 1 | 1 | P2 | RE 201, OCC = 2 | MU-MIMO |
| 2 | 2 | P1, P2 | RE 201, OCC = 2 | SU-MIMO |
| 3 | 3 | P1, P2, P3 | RE 201, RE 202, OCC = 2 | SU-MIMO |
| 4 | 4 | P1, P2, P3, P4 | RE 201, RE 202, OCC = 4 | SU-MIMO |
| 5 | 5 | P1, P2, P3, P4, P5 | RE 201, RE 202 OCC = 4 | SU-MIMO |
| 6 | 6 | P1, P2, P3, P4, P5, P6 | RE 201, RE 202 OCC = 4 | SU-MIMO |
| 7 | 7 | P1, P2, P3, P4, P5, P6, P7 | RE 201, RE 202 OCC = 4 | SU-MIMO |
| 8 | 8 | P1, P2, P3, P4, P5, P6, P7, P8 | RE 201, RE 202 OCC = 4 | SU-MIMO |
| 9 | 1 | P1 | RE 201, OCC = 4 | MU-MIMO |
| 10 | 1 | P2 | RE 201, OCC = 4 | MU-MIMO |
| 11 | 1 | P5 | RE 201, OCC = 4 | MU-MIMO |
| 12 | 1 | P6 | RE 201, OCC = 4 | MU-MIMO |
| 13 | 2 | P1, P2 | RE 201, OCC = 4 | MU-MIMO |
| 14 | 2 | P5, P6 | RE 201, OCC = 4 | MU-MIMO |

It should be noted that, the MU-MIMO transmission described in this embodiment of the present invention is based on orthogonal pilot. That is, the pilots used by different users are orthogonal. If the system supports MU-MIMO not that the same current pilot-resource use status of the system or another combination of a UE transmission parameter, the pilot resource of each spatial transmission layer, and current pilot resource used by the communication system is used during the retransmission and initial transmission. The number of the combination may be set randomly as long as the combination and number are in a one-to-one mapping relationship. The pilot resource used by each spatial transmission layer and the current pilot-resource use status of the system may also use another pilot resource. For example, the pilot resource used by one spatial transmission layer corresponding to the pilot-resource information numbered as 0 in the table is P2 on RE 201, or P3 on RE 202. When a problem of power usage balance on different pilot RE resources is taken into consideration, a preferred setting is that a difference between the numbers of transmission layers corresponding to different frequency division pilot resources (RE 201 and RE 202) is the smallest. For example, if the number of spatial transmission layers of the user is 6, three code division orthogonal pilots on RE 201 and three code division orthogonal pilots on RE 202 should be set, instead of using four code division orthogonal pilots on RE 201 and two code division orthogonal pilots on RE 202.

In addition, according to the embodiment of the present invention, the UE may obtain the pilot resource information of another matching UE through the current pilot-resource use status of the communication system, for example, by agreeing on which UE or UEs used by the matching UE in advance. For example, if the eNodeB and UE agrees on using the first RE 201 in advance, in the foregoing example, the first UE may know that its pilot resource is p1, and infer that the pilot resources used by the second UE may be p2, p5, and p6. In this way, the first UE may estimate the channel estimation value of the second UE by detecting pilot resources p2, p5, and p6, and perform signal detection or interface suppression detection according to the channel estimation value of the second UE. The second UE may know that its pilot resources are p2 and p5, and infer that the pilot resources used by the first UE may be p1 and p6. In this way, the second UE may estimate the channel estimation value of the first UE by detecting pilot resources p1 and p6, and perform signal detection or interface suppression detection according to the channel estimation value of the first UE.

Figure 3:
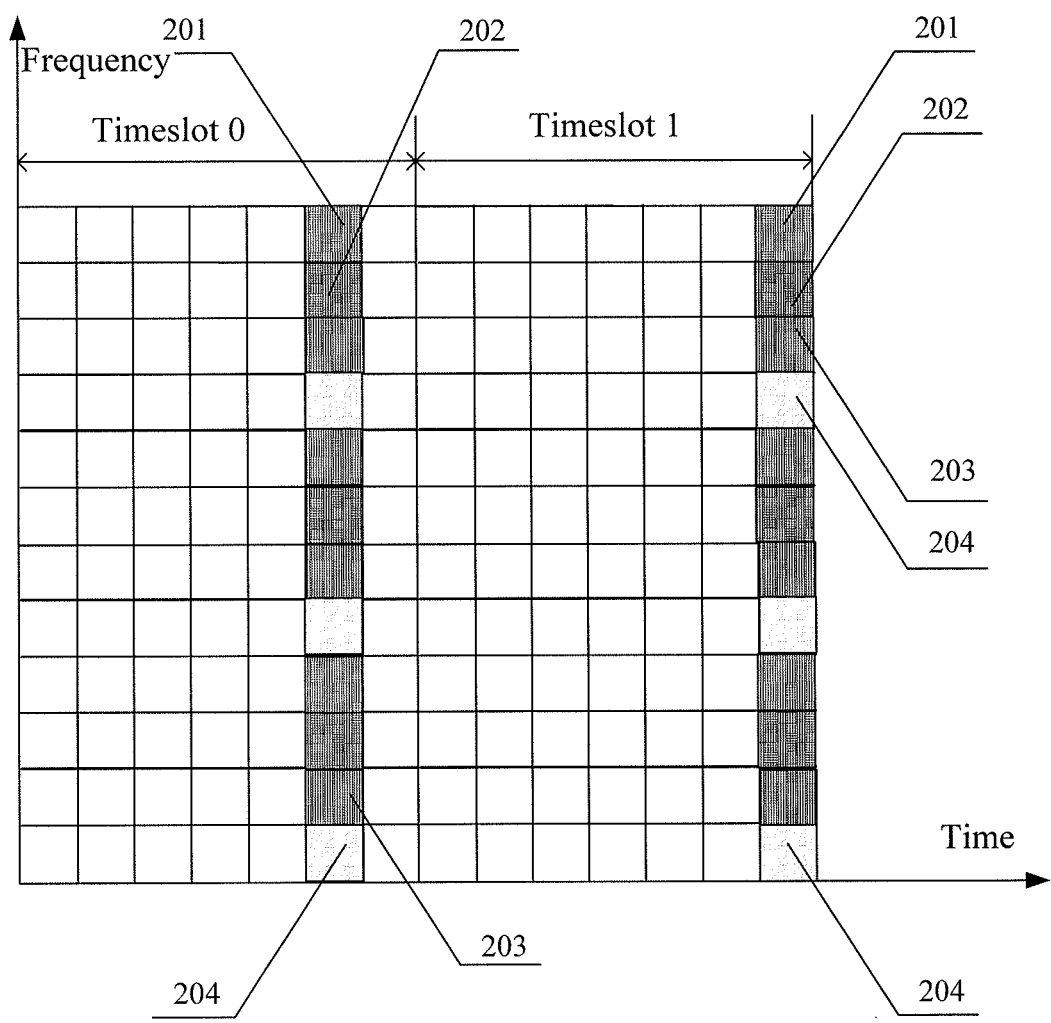
FIG. 3 is a schematic diagram of another time-frequency resource block.

FIG. 3 is a schematic diagram of another time-frequency resource block. Compared with the time-frequency resource block as shown in FIG. 2, in the time-frequency resource block shown in FIG. 3, a first RE 201, second RE 202, third RE 203, and fourth RE 204 correspond to pilot resources at a first spatial transmission layer, second spatial transmission layer, third spatial transmission layer, and fourth spatial transmission layer respectively, which are marked by p1, p2, p3, and p4.

Suppose that a first UE and second UE are matching UEs. An eNodeB allocates one spatial transmission layer and a pilot resource for transmission at the spatial transmission layer to the first UE. That is, the number of spatial transmission layers is 1, and the pilot resource for transmission at the first spatial transmission layer is p1. The eNodeB allocates two spatial transmission layers and a pilot resource for transmission at each spatial transmission layer to the second UE. That is, the number of spatial transmission layers is 2, and the pilot resource for transmission at the first spatial transmission layer is p2. Pilot resources used by a communication system are p1, p2, and p3. The eNodeB generates pilot resource information according to the number of spatial transmission layers allocated to the first UE, the pilot resource for transmission at each spatial transmission layer allocated to the first UE, and a current pilot-resource use status of the communication system, and carries the pilot resource information in data information and sends the data information to the first UE. The eNodeB generates pilot resource information according to the number of spatial transmission layers allocated to the second UE, the pilot resource for transmission at each spatial transmission layer allocated to the second UE, and the current pilot-resource use status of the communication system, and carries the pilot resource information in data information and sends the data information to the second UE.

After obtaining the pilot resource information from the data information, the first UE may know, according to the pilot resource information in the data information, that the number of spatial transmission layers allocated to itself is 1, and that the pilot resource for transmission at the first spatial transmission layer is p1, and thus, may know that its pilot resource is p1. Further, the pilot resources used by the communication system are p1, p2, and p3, so it may be known that a data transmission RE is an RE other than the first RE 201, second RE 202, and third RE 203 that are as shown in FIG. 3. Therefore, the first UE may correctly obtain service data sent by the eNodeB to itself from the data transmission RE. The first UE may know that its pilot resource is p1, and infer that the pilot resources possibly used by the second UE are p2 and p3. In this way, the first UE may estimate a channel estimation value of the second UE by detecting pilot the resources p2 and p3, and perform signal detection or interface suppression detection according to the channel estimation value of the second UE.

Similarly, after obtaining the pilot resource information from the data information, the second UE may know, according to the pilot resource information in the data information, that the number of spatial transmission layers allocated to itself is 2, and that the pilot resource for transmission at the first spatial transmission layer is p2, and thus, may know that its pilot resources are p2 and p3. Further, the pilot resources used by the communication system are p1, p2, and p3, so it may be known that a data transmission RE is an RE other than the first RE 201, second RE 202, and third RE 203 that are as shown in FIG. 3. Therefore, the second UE may correctly obtain service data sent by the eNodeB to itself from the data transmission RE. The second UE may know that its pilot resources are p2 and p3, and infer that the pilot resource possibly used by the first UE is p1. In this way, the second UE may estimate a channel estimation value of the first UE by detecting the pilot resource p1, and perform signal detection or interface suppression detection according to the channel estimation value of the first UE.

Figure 4:
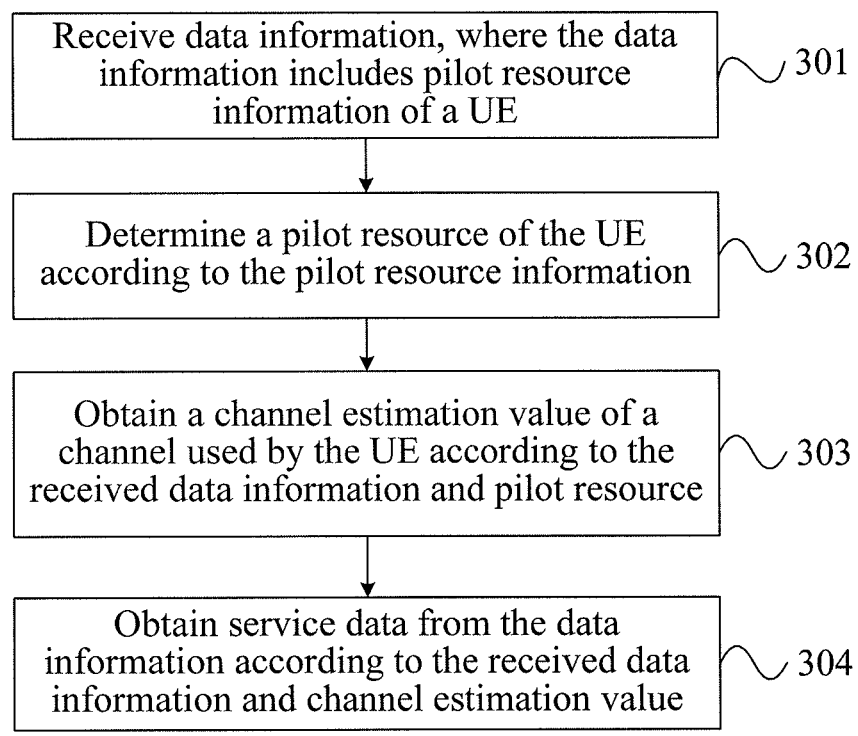
FIG. 4 is a flowchart of an embodiment of a method for processing data receiving according to the present invention.

FIG. 4 is a flowchart of an embodiment of a method for processing data receiving according to the present invention. The process of this embodiment may be specifically implemented by a UE. As shown in FIG. 4, the method includes the following steps:

Step 301: Receive data information, where the data information includes pilot resource information of a UE.

Step 302: Determine a pilot resource of the UE according to the pilot resource information.

Specifically, the pilot resource information in step 301 may include a pilot resource of the UE for transmission at the first spatial transmission layer in each spatial transmission layer allocated to the UE and the number of spatial transmission layers allocated to the UE. Accordingly, in step 302, according to the pilot resource for transmission at the first spatial transmission layer and the number of spatial transmission layers, the UE may obtain its own pilot resource. Or, the pilot resource information in step 301 may also be the pilot resource of the UE for transmission at each spatial transmission layer allocated to the UE. In this case, in step 302, the pilot resources of the UE may be directly obtained from the pilot resource information.

In addition, the pilot resource information in step 301 may also be the pilot resource of the UE for transmission at the first spatial transmission layer in each spatial transmission layer allocated to the UE. In this way, in the case that the number of spatial transmission layers is preset for each UE, the UE may obtain its pilot resource according to the its preset number of spatial transmission layers and the pilot resource for transmission at the first spatial transmission layer.

Step 303: Obtain, according to the received data information and pilot resource, a channel estimation value of a channel used by the UE.

Specifically, according to an embodiment of the present invention, in a CDM mode, a mapping relationship between the pilot resource and a code word may be preset. Accordingly, in step 303, the code word corresponding to the pilot resource of the UE may be obtained according to the mapping relationship between the pilot resource and code word, and the channel estimation value of the channel used by the UE is obtained according to the received data information and code word of the pilot resource. In addition, the code word of the pilot resource may also be sent by the eNodeB.

As an embodiment of the present invention, the code word of the pilot resource may include: c1=[1,1,1,1], c2=[1,-1,1,-1], c3[1,1,-1,-1], and c4=[1,-1,-1,1]. At this time, the first half section of c1 is [+1 +1], and the first half section of c2 is [+1-1], which are orthogonal. Meanwhile, the second half section of c1 is [+1 +1], and the second half section of c2 is [+1-1], which are also orthogonal. Apparently, c1 and c2 are orthogonal. That is to say, c1 and c2 are vectors that are orthogonal by section. Similarly, c3 and c4 are also vectors that are orthogonal by section.

According to another embodiment of the present invention, the code word of the pilot resource may include: c1=[1,0,1,0], c2=[0,1,0,1], c3=[1,0,-1,0], and c4[0,1,0,-1]. In this embodiment, c1 and c2 are also vectors that are orthogonal by section. Similarly, c3 and c4 are also vectors that are orthogonal by section. When c1=[1,0,1,0], c2=[0,1,0,1], c3=[1,0,-1,0], and c4=[0,1,0,-1], the symbol represented by 0 in the code word indicates that no data exists and that a frequency division multiplexing mode is used. Compared with the CDM mode used when c1=[1,1,1,1], c2=[1,-1,1,-1], c3=[1,1,-1,-1], and c4=[1,-1,-1,1], channel estimation performance is higher.

In addition, according to other embodiments of the present invention, the code word of the pilot resource may also select another 4×4 orthogonal matrix that has the subsection-by-subsection orthogonal feature. According to relevant regulations of the 3GPP, the use of 4×4 orthogonal matrix of the code word that has the subsection-by-subsection orthogonal feature may improve the channel estimation performance.

Step 304: Obtain service data from the data information according to the received data information and channel estimation value.

In addition, as another embodiment of the method for processing data receiving according to the present invention, on the basis of the embodiment as shown in FIG. 4, the data information received in step 301 further includes the current pilot-resource use status of the communication system. Accordingly, the UE may estimate the channel estimation value of another UE except itself among matching UEs according to the current pilot-resource use status, and perform signal detection or interference suppression detection according to the channel estimation value of another UE.

Figure 5:
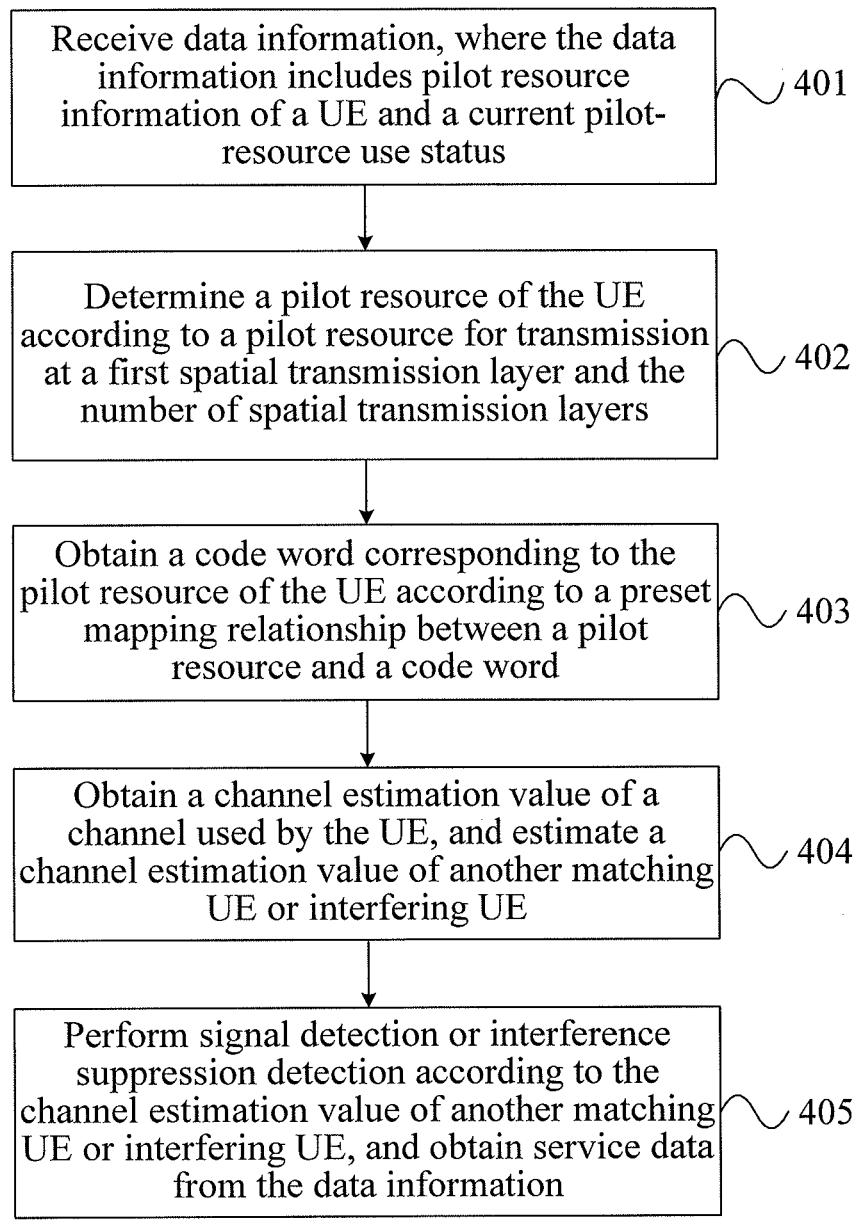
FIG. 5 is a flowchart of another embodiment of a method for processing data receiving according to the present invention.

FIG. 5 is a flowchart of another embodiment of a method for processing data receiving according to the present invention. The process of the embodiment may be implemented by a first UE. As shown in FIG. 5, the method includes the following steps:

Step 401: A UE receives data information, where the data information includes pilot resource information of the UE and a current pilot-resource use status of a communication system. The pilot resource information of the UE includes a pilot resource for transmission at a first spatial transmission layer in each spatial transmission layer allocated to the UE and the number of spatial transmission layers allocated to the UE.

Step 402: The UE determines a pilot resource of the UE according to the pilot resource for transmission at the first spatial transmission layer and the number of spatial transmission layers.

Step 403: The UE obtains, according to a preset mapping relationship between the pilot resource and a code word, a code word corresponding to the pilot resource of the UE.

Step 404: The UE obtains, according to the received data information and obtained code word of the pilot resource, a channel estimation value of a channel used by the UE, and estimates a channel estimation value of another UE or interfering UE except itself among matching UEs according to the current pilot-resource use status of the communication system.

Taking an example that the time-frequency resource of the communication system is the time-frequency resource block as shown in FIG. 2, the following method may be used to obtain the channel estimation value of the channel used by the UE.

Taking eight transmit antennas for example, suppose that the number of spatial transmission layers is eight, that is, eight layers of signals are transmitted in space. The receiving signal on one receiving antenna of the UE is:

$$y = HWX + n \qquad (1)$$

$$= [h_{11} \quad h_{12} \quad h_{13} \quad h_{14} \quad h_{15} \quad h_{16} \quad h_{17} \quad h_{18}]$$

$$\begin{bmatrix} w_{11} & w_{12} & \cdots & w_{18} \\ w_{21} & w_{22} & \cdots & w_{28} \\ \vdots & \vdots & \vdots & \vdots \\ w_{81} & w_{82} & \cdots & w_{88} \end{bmatrix} \begin{bmatrix} x_1 \\ x_2 \\ \vdots \\ x_8 \end{bmatrix} + n$$

$$= [\tilde{h}_1 \quad \tilde{h}_2 \quad \cdots \quad \tilde{h}_8] \begin{bmatrix} x_1 \\ x_2 \\ \vdots \\ x_8 \end{bmatrix} + n$$

Where, $\tilde{h}_1$ to $\tilde{h}_8$ are synthesized channel coefficients, $w_{ij}$ is a weighting coefficient transmitted on an $i^{th}$ ($i=1, \ldots, 8$) transmit antenna by a $j^{th}$ spatial transmission layer, and $x_j$ ($j=1, \ldots, 8$) is a transmission symbol at the $j^{th}$ spatial transmission layer. It can be seen from the preceding formula (1) that, the UE only needs to estimate the synthesized channel coefficient $\tilde{h}_j$ ($j=1, \ldots, 8$) and then may perform data detection.

For the transmission of the pilot resource at the first spatial transmission layer, the eNodeB at a transmit end may specifically perform the following processing:

$$\begin{bmatrix} w_{11} \\ w_{21} \\ \vdots \\ w_{81} \end{bmatrix} [c_{11} \quad c_{12} \quad c_{13} \quad c_{14}] s = \begin{bmatrix} \begin{bmatrix} w_{11} \\ w_{21} \\ \vdots \\ w_{81} \end{bmatrix} c_{11}s, & \begin{bmatrix} w_{11} \\ w_{21} \\ \vdots \\ w_{81} \end{bmatrix} c_{12}s, \\ \begin{bmatrix} w_{11} \\ w_{21} \\ \vdots \\ w_{81} \end{bmatrix} c_{13}s, & \begin{bmatrix} w_{11} \\ w_{21} \\ \vdots \\ w_{81} \end{bmatrix} c_{14}s \end{bmatrix} \quad (2)$$

Where, s indicates a pilot symbol transmitted on the pilot resource, and $c_{ij}$ is a $j^{th}$ (j=1, ..., 4) symbol of a code word $c_i$ (i=1, ..., 4). In the right side of the equal sign of the preceding formula (2), the first column is on a first RE 201 of a sixth OFDM symbol in a timeslot 0, and is transmitted over eight transmit antennas respectively. The second column is on the first RE 201 of a seventh OFDM symbol in the timeslot 0, and is transmitted over eight transmit antennas respectively. The third column is on the first RE 201 of the sixth OFDM symbol in a timeslot 1, and is transmitted over eight transmit antennas respectively. The fourth column is on the first RE 201 of the seventh OFDM symbol in the timeslot 1, and is transmitted over eight transmit antennas respectively. Accordingly, the code words $c_1$ to $c_4$ are used for the pilot resources at the first to a fourth spatial transmission layers. Similarly, the same method may be used for the pilot resources at a fifth to an eighth spatial transmission layers, where the pilot resources at a fifth to an eighth spatial transmission layers are transmitted on a second RE 202.

For a receiving antenna, a corresponding receiving signal in four first RE 201 areas is:

$$y = [y_1 \quad y_2 \quad y_3 \quad y_4] \quad (3)$$
$$= [h_{11} \quad h_{12} \quad \ldots \quad h_{18}]$$
$$\left( \begin{bmatrix} w_{11} \\ w_{21} \\ \vdots \\ w_{81} \end{bmatrix} [c_{11} \quad c_{12} \quad c_{13} \quad c_{14}]s + \ldots + \begin{bmatrix} w_{14} \\ w_{24} \\ \vdots \\ w_{84} \end{bmatrix} [c_{41} \quad c_{42} \quad c_{43} \quad c_{44}]s \right) + n,$$
$$= c_1\tilde{h}_1 s + c_2\tilde{h}_2 s + c_3\tilde{h}_3 s + c_4\tilde{h}_4 s + n$$

Where, n indicates a noise, and $\tilde{h}_1$ to $\tilde{h}_4$ are coefficients of four synthesized channels, that is:

$$\tilde{h}_i = [h_{11} \quad h_{12} \quad \ldots \quad h_{18}] \begin{bmatrix} w_{1i} \\ w_{2i} \\ \vdots \\ w_{8i} \end{bmatrix}, i = 1 \ldots 4 \quad (4)$$

Further, the channel estimation value of $\hat{h}_1$ may be obtained through the following formula (5):

$$\hat{h}_1 = \frac{1}{4}(c_1)^H y \quad (5)$$

Similarly, the channel estimation values of $\tilde{h}_2$ to $\tilde{h}_4$ may be obtained. A similar channel estimation method may be used to obtain the channel estimation values of $\tilde{h}_5$ to $\tilde{h}_8$ for 12 second RE 202s in FIG. 2.

Step 405: The UE obtains service data from the data information according to the received data information and channel estimation value through the formula $\tilde{S}=G^H Y$. For example, according to the channel estimation value of another matching UE or interfering UE, signal detection or interference suppression detection is performed, and the service data is obtained from the data information.

Where, $\tilde{S}$ indicates the service data obtained by the UE through the detection, Y indicates the service data received by the UE according to the data information, and G is a processing vector of the UE;

$$G = \left( H_1 H_1^H + \sum_i H_i H_i^H + \alpha I_N \right)^{-1} H_1,$$

where $H_1$ indicates the channel estimation value of the UE, $H_i$ indicates the channel estimation value of another matching UE or interfering UE among matching UEs except the UE, $I_N$ indicates an N-dimension unit matrix, and $\alpha$ indicates a signal-to-noise ratio factor; $\alpha=P_n/P$, where $P_n$ indicates noise power, and P indicates transmit signal power at each spatial transmission layer before the UE pre-processes the data information. If the transmit signal power at each spatial transmission layer before the UE pre-processes the data information is 1, $\alpha=P_n$.

Figure 6:
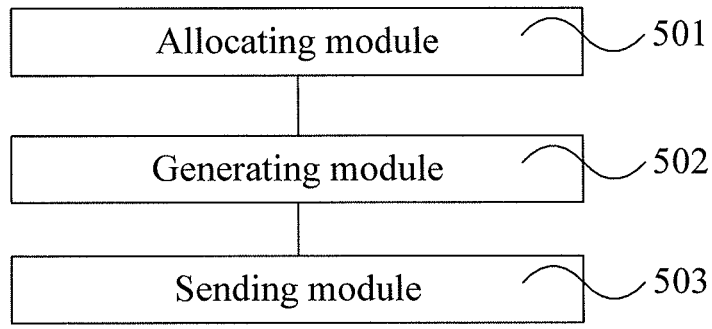
FIG. 6 is a schematic structural diagram of an embodiment of an apparatus for processing data sending according to the present invention.

FIG. 6 is a schematic structural diagram of an embodiment of an apparatus for processing data sending according to the present invention. The apparatus for processing data sending in this embodiment may serve as an eNodeB, or be set in an eNodeB to implement the process in the embodiment as shown in FIG. 1 of the present invention. As shown in FIG. 6, the apparatus for processing data sending according to this embodiment includes an allocating module 501, a generating module 502, and a sending module 503. The allocating module 501 is configured to allocate the number of spatial transmission layers and a pilot resource for transmission at each spatial transmission layer to the UE. The generating module 502 is configured to generate pilot resource information according to the number of spatial transmission layers and the pilot resource for transmission at each spatial transmission layer that are allocated by the allocating module 501. Specifically, the pilot resource information may include: a pilot resource of the UE for transmission at a first spatial transmission layer in each spatial transmission layer allocated to the UE and the number of spatial transmission layers allocated to the UE, or a pilot resource of the UE for transmission at each spatial transmission layer allocated to the UE, or a pilot resource of the UE for transmission at the first spatial transmission layer in each spatial transmission layers allocated to the UE. In addition, the pilot resource information may further include: a current pilot-resource use status of a communication system and/or a use status of the pilot resource for transmission at each spatial transmission layer allocated to the UE, for example, in a CDM mode, a code word of the pilot resource for transmission at each spatial transmission layer allocated to the UE. The sending module 503 is configured to send data information to the UE, where the data information includes the pilot resource information generated by the generating module 502.

The generating module 502 may include a first generating unit, where the first generating unit is configured to set the current pilot-resource use status of the communication system corresponding to the number of spatial transmission layers and the use status of the pilot resource for transmission at each spatial transmission layer allocated to the UE, combine the number of spatial transmission layers, current pilot-resource use status of the communication system, and use status of the pilot resource for transmission at each spatial transmission layer allocated to the UE, number each combination, and use the number as the pilot resource information.

The allocating module may include a first allocating unit, where the first allocating unit is configured to allocate a code-division orthogonal pilot resource to a MU-MIMO UE, where the REs of the code-division orthogonal pilot resource are the same.

Particularly, when the number of spatial transmission layers of the UE is the same, the overhead of the pilot resource used in a SU-MIMO mode and allocated by the allocating module to the UE is the same as the overhead of the pilot resource used in a MU-MIMO mode.

Figure 7:
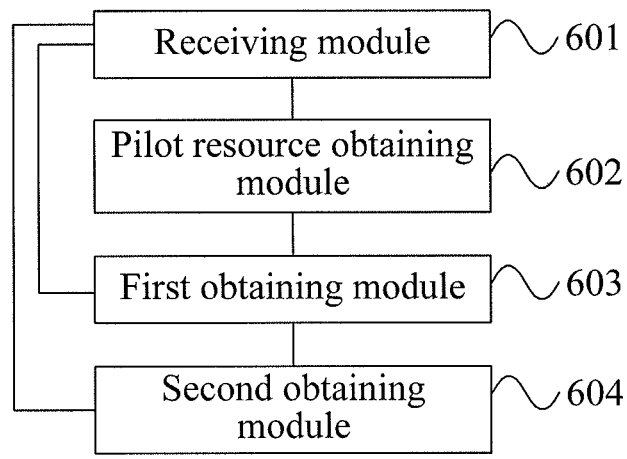
FIG. 7 is a schematic structural diagram of an embodiment of an apparatus for processing data receiving according to the present invention.

FIG. 7 is a schematic structural diagram of an embodiment of an apparatus for processing data receiving according to the present invention. The apparatus for processing data sending in this embodiment may serve as a UE, or be set in a UE to implement the process in the embodiment as shown in FIG. 4 or FIG. 5 of the present invention. As shown in FIG. 7, the apparatus for processing data sending according to this embodiment includes a receiving module 601, a pilot resource obtaining module 602, a first obtaining module 603, and a second obtaining module 604. The receiving module 601 is configured to receive data information, where the data information includes pilot resource information of a UE. The pilot resource obtaining module 602 is configured to determine a pilot resource of the UE according to the pilot resource information in the data information received by the receiving module 601. The first obtaining module 603 is configured to obtain, according to the data information and pilot resource that are received by the receiving module 601, a channel estimation value of a channel used by the UE. As an embodiment of the present invention, the first obtaining module 603 may obtain, according to a preset mapping relationship between the pilot resource and a code word, a code word corresponding to the pilot resource of the UE, where the pilot resource of the UE is determined by the pilot resource obtaining module 602. Or, the pilot resource information carries the code word of the pilot resource, and the first obtaining module 603 obtains the code word of the pilot resource from the pilot resource information, and further obtains, according to the data information received by the receiving module 601 and the code word of the pilot resource, the channel estimation value of the channel used by the UE. The second obtaining module 604 is configured to perform data detection and obtain service data according to the data information received by the receiving module 601 and the channel estimation value obtained by the first obtaining module 603.

Specifically, as an embodiment of the present invention, the second obtaining module 604 obtains the service data according to a formula $\tilde{S}=G^H Y$, where, $\tilde{S}$ indicates the service data obtained by the UE through the detection, Y indicates the service data received by the UE according to the data information, and G indicates a processing vector of the UE;

$$G = \left(H_1 H_1^H + \sum_i H_i H_i^H + \alpha I_N\right)^{-1} H_1,$$

where $H_1$ indicates the channel estimation value of the UE, Hi indicates the channel estimation value of another matching UE or interfering UE among matching UEs except the UE, $I_N$ indicates an N-dimension unit matrix, and $\alpha$ indicates a signal-to-noise ratio factor; $\alpha=P_n/P$, where $P_n$ indicates noise power, and P indicates transmit signal power at each spatial transmission layer before the UE pre-processes the data information. If the transmit signal power at each spatial transmission layer before the UE pre-processes the data information is 1, $\alpha=P_n$.

According to an embodiment of the present invention, the pilot resource information may specifically be a pilot resource for transmission at a first spatial transmission layer in each spatial transmission layer allocated to the UE and the number of spatial transmission layers allocated to the UE, or the pilot resource for transmission at each spatial transmission layer allocated to the UE. In addition, the pilot resource information may also be the pilot resource for transmission at the first spatial transmission layer in each spatial transmission layer allocated to the UE. Accordingly, the pilot resource obtaining module 602 determines the pilot resource of the UE according to the preset number of spatial transmission layers and the pilot resource for transmission at the first spatial transmission layer.

Figure 8:
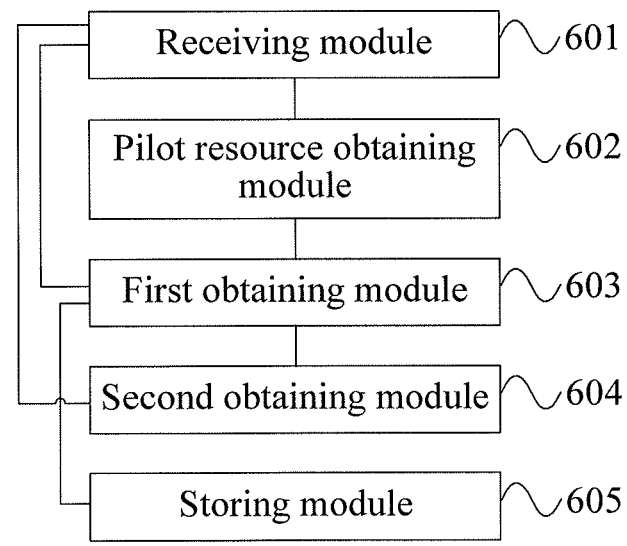
FIG. 8 is a schematic structural diagram of another embodiment of an apparatus for processing data receiving according to the present invention.

FIG. 8 is a schematic structural diagram of another embodiment of an apparatus for processing data receiving according to the present invention. The apparatus for processing data sending in this embodiment may serve as a UE, or be set in a UE to implement the process in the embodiment as shown in FIG. 4 or FIG. 5 of the present invention. Compared with the embodiment as shown in FIG. 7, the apparatus for processing data receiving according to this embodiment further includes a storing module 605, configured to store a preset mapping relationship between a pilot resource and a code word. Accordingly, a first obtaining module 603 obtains, according to the mapping relationship between the pilot resource and the code word, where the mapping relationship between the pilot resource and the code word is stored by the storing module 605, a code word of the pilot resource of the UE, where the pilot resource of the UE is determined by the pilot resource obtaining module 602. Or, the receiving module 601 is further configured to receive the code word of the pilot resource, where the code word of the pilot resource is sent by an eNodeB and may be included in the pilot resource information. Accordingly, the first obtaining module 603 obtains a channel estimation value of a channel used by the UE according to the data information received by the receiving module 601 and the code word of the pilot resource, where the code word of the pilot resource is sent by the eNodeB.

Figure 9:
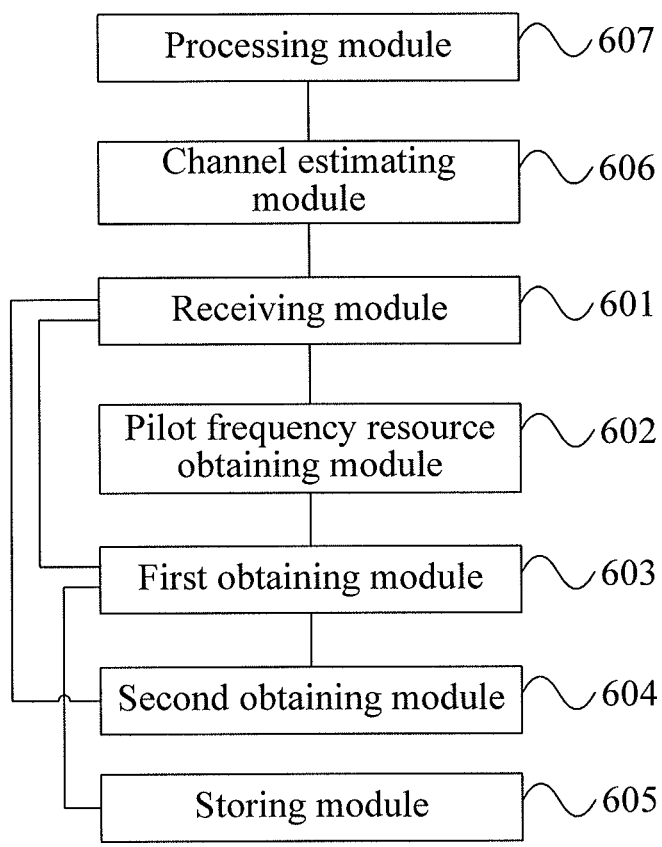
FIG. 9 is a schematic structural diagram of another embodiment of an apparatus for processing data receiving according to the present invention.

FIG. 9 is a schematic structural diagram of another embodiment of an apparatus for processing data receiving according to the present invention. The apparatus for processing data sending in this embodiment may serve as a UE, or be set in a UE to implement the process in the embodiment as shown in FIG. 4 or FIG. 5 of the present invention. Compared with the embodiment as shown in FIG. 7 or FIG. 8, in the apparatus for processing data receiving in this embodiment, data information received by a receiving module 601 further includes a current pilot-resource use status of a communication system. Accordingly, the apparatus for processing data receiving further includes a channel estimating module 606 and a processing module 607. The channel estimating module 606 is configured to estimate a channel estimation value of another matching UE or interfering UE among matching UEs except the UE itself according to the current pilot-resource use status of the communication system, where the current pilot-resource use status of the communication system is received by the receiving module 601. The processing module 607 is configured to perform signal detection or interference suppression detection according to the channel estimation value of another matching UE or interfering UE among the matching UEs except the UE itself, where the channel estimation value of another matching UE or interfering UE among the matching UEs except the UE itself is estimated by the channel estimating module 606.

An embodiment of the present invention provides a communication system, including an eNodeB and a UE. The eNodeB is configured to allocate the number of spatial transmission layers to a UE and A pilot resource for transmission at each spatial transmission layer to the UE, generate pilot resource information according to the number of spatial transmission layers and the pilot resource for transmission at each spatial transmission layer, and send data information to the UE, where the data information includes the pilot resource information. Specifically, the eNodeB may be implemented through the apparatus for processing data sending in the embodiment as shown in FIG. 6 of the present invention.

The UE is configured to receive data information sent by the eNodeB, determine a pilot resource of the UE according to the pilot resource information in the data information, obtain, according to the data information and the pilot resource, a channel estimation value of a channel used by the UE, and obtain service data according to the data information and channel estimation value. Specifically, the UE may be implemented through the apparatus for processing data receiving in the embodiment as shown in FIG. 7, FIG. 8, or FIG. 9.

Figure 10:
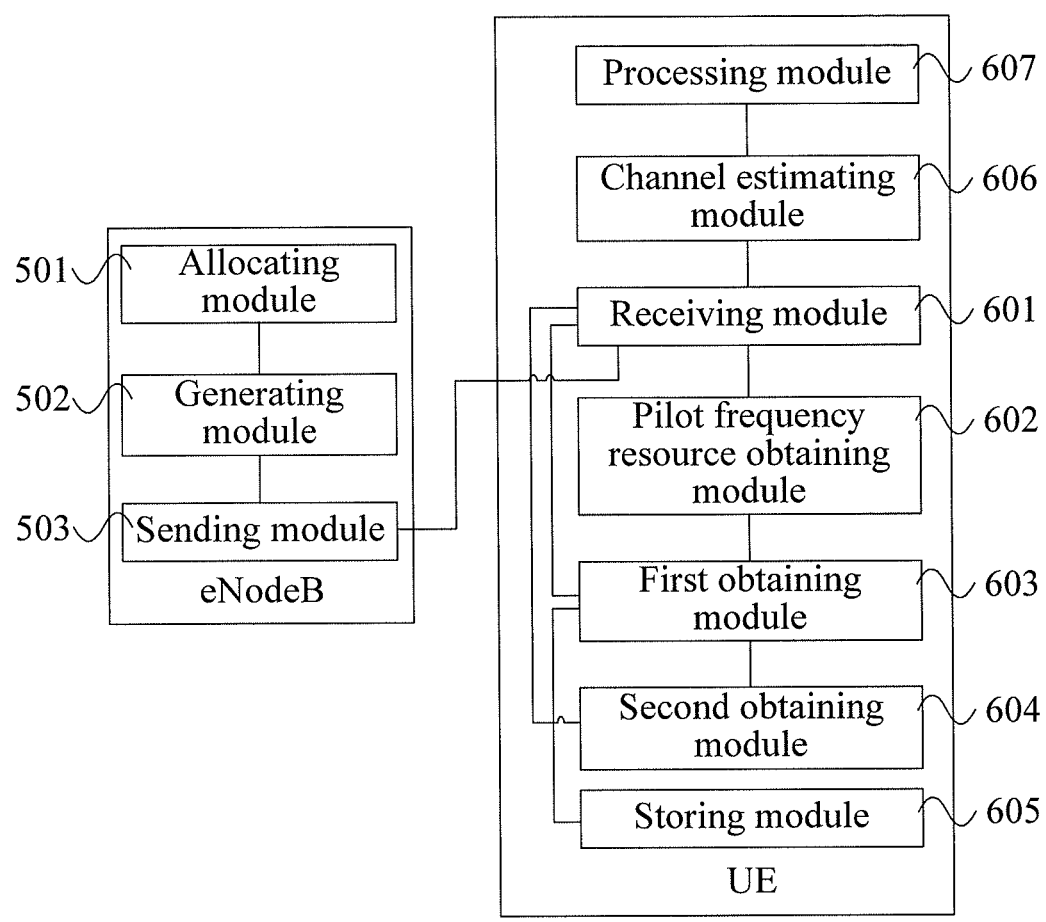
FIG. 10 is a schematic structural diagram of an embodiment of a communication system according to the present invention.

FIG. 10 is a schematic structural diagram of an embodiment of a communication system according to the present invention. In this embodiment, an eNodeB uses the apparatus for processing data sending in the embodiment as shown in FIG. 6 of the present invention, and a UE uses the apparatus for processing data receiving in the embodiment as shown in FIG. 9 of the present invention. When the UE uses the apparatus for processing data receiving in the embodiment as shown in FIG. 7 or FIG. 8 of the present invention, a connection relationship between corresponding modules in the UE and eNodeB is the same as that in FIG. 10.

Those of ordinary skill in the art may understand that all or part of steps in the foregoing method embodiments may be implemented through a program instructing relevant hardware. The program may be stored in a computer readable storage medium. When the program is executed, the steps in the foregoing method embodiments are performed. The storage medium includes various media that may store program codes, such as a ROM, a RAM, a magnetic disk, or a compact disk.

According to the embodiments of the present invention, pilot resource information may be generated according to the number of spatial transmission layers allocated to each UE and a pilot resource for transmission at each spatial transmission layer allocated to the UE, and sent to the UE. Then, the UE may determine a specific pilot resource to be used so as to effectively distinguish between user channels, obtain a correct channel estimation value, improve channel estimation performance, and thus, obtain correct service data.

Finally, it should be noted that the preceding embodiments are merely used to describe the technical solutions of the present invention instead of limiting the technical solutions of the present invention. Those of ordinary skill in the art should understand that modifications or equivalent replacements to the technical solutions of the present invention may be made without departing from the spirit and scope of the technical solutions of the present invention. In the embodiment of the present invention, pilot resource information is generated and sent to a UE so as to enable the UE to determine a specific pilot resource to be used, effectively distinguish between user channels, obtain a correct channel estimation value, improve channel estimation performance, and thus, obtain correct service data.

What is claimed is:

1. A method for processing data sending, comprising:
    allocating a number of spatial transmission layers to a user equipment (UE) and a pilot symbol for transmission at the spatial transmission layers allocated to the UE;
    determining pilot symbol information according to combination of information about the number of spatial transmission layers allocated to the UE and the pilot symbol for transmission at a spatial transmission layer allocated to the UE; and
    sending, in a time-frequency domain to the UE, data information comprising the determined pilot symbol information, enabling the UE to obtain a channel estimation value according to the pilot symbol information.

2. The method according to claim 1, wherein, the pilot symbol information comprises:
    a pilot symbol of the UE for transmission at a first spatial transmission layer in the spatial transmission layers allocated to the UE, and a number of spatial transmission layers; or
    a pilot symbol of the UE for transmission at each spatial transmission layer allocated to the UE; or
    a pilot symbol of the UE for transmission at a first spatial transmission layer in the spatial transmission layers allocated to UE.

3. The method according to claim 2, wherein, the pilot symbol information further comprises:
    a current pilot symbol use status of a communication system, and/or
    a use status of the pilot symbol for transmission at the spatial transmission layers.

4. The method according to claim 3, wherein, the determining pilot symbol information according to the number of spatial transmission layers and the pilot symbol for transmission at the spatial transmission layers allocated to the UE comprises:
    setting a current pilot symbol use status of the communication system corresponding to the number of spatial transmission layers and the use status of the pilot symbol for transmission at the spatial transmission layers allocated to the UE, combining a spatial transmission layer number, current pilot symbol use status of the communication system, and use status of the pilot symbol for transmission at the spatial transmission layers allocated to the UE, numbering the combination, and using the combination number as the pilot symbol information.

5. The method according to claim 1, wherein, the allocating of pilot symbols comprises:
    allocating a pilot symbol to a multiple user multiple input multiple output (MU-MIMO) UE on a same time-frequency resource element (RE); or
    allocating a code division orthogonal pilot symbol to a MU-MIMO UE on a same RE; or
    allocating pilot symbols with same overhead of time-frequency resource elements (REs) to a single user MIMO (SU-MIMO) UE and a MU-MIMO UE when the number of spatial transmission layers of a plurality of UEs are same.

6. A method for processing data receiving, comprising:
    receiving data information which comprises pilot symbol information of user equipment (UE);
    determining a pilot symbol of the UE according to the pilot symbol information generated according to combination of information about a number of spatial transmission layers allocated to the UE and a pilot symbol for transmission at a spatial transmission layer allocated to the UE;

obtaining, according to the determined pilot symbol, a channel estimation value of a channel used by the UE; and obtaining service data according to the data information and the channel estimation value.

7. The method according to claim 6, wherein:

the method further comprises: estimating, by the UE, a channel estimation value of another matching UE or another interfering UE among matching UEs except the UE;

the obtaining service data according to the data information and the channel estimation value comprises:

obtaining the service data according to $\hat{S}=G^H Y$, wherein, $\hat{S}$ indicates service data obtained by the UE through detection, Y indicates service data received by the UE according to the data information, and G indicates a processing vector of the UE;

$$G = \left( H_1 H_1^H + \sum_1 H_i H_i^H + \alpha I_N \right)^{-1} H_1,$$

wherein $H_1$ indicates the channel estimation value of the UE, $H_i$ indicates the channel estimation value of another matching UE or another interfering UE among the matching UEs except the UE, $I_N$ indicates an N-dimension unit matrix, and $\alpha$ is a signal-to-noise ratio factor; and $\alpha=P_n/P$, wherein $P_n$ indicates noise power, and P indicates transmit signal power of each spatial transmission layer before the UE pre-processes the data information.

8. The method according to claim 6, wherein:

the generated pilot symbol information comprises: a pilot symbol of the UE for transmission at a first spatial transmission layer in the spatial transmission layers allocated to the UE, and the number of spatial transmission layers allocated to the UE; and the determining a pilot symbol of the UE according to the generated pilot symbol information comprises: determining the pilot symbol of the UE according to the pilot symbol information; or the generated pilot symbol information comprises: a pilot symbol of the UE for transmission at each spatial transmission layer allocated to the UE; and the determining a pilot symbol of the UE according to the generated pilot symbol information comprises: determining the pilot symbol of the UE directly according to the pilot symbol information; or the generated pilot symbol information comprises: the pilot symbol of the UE for transmission at a first spatial transmission layer in spatial transmission layers allocated to the UE; and the determining a pilot symbol of the UE according to the generated pilot symbol information comprises: determining the pilot symbol of the UE according to a preset number of spatial transmission layers and a pilot symbol for transmission at a first spatial transmission layer.

9. The method according to claim 8, wherein:

the determining a pilot symbol of the UE according to the pilot symbol information comprises: allocating a pilot symbol used by the spatial transmission layers of the UE one by one starting from a pilot symbol for transmission at a first spatial transmission layer in a preset pilot symbol set of the UE;

the determining the pilot symbol of the UE directly according to the pilot symbol information comprises: using the pilot symbol for transmission at a spatial transmission layer allocated to the UE as a pilot symbol of the UE; and the determining the pilot symbol of the UE according to the preset number of spatial transmission layers and the pilot symbol for transmission at the first spatial transmission layer comprises: allocating a pilot symbol of the UE one by one, wherein the allocated pilot symbol corresponds to the preset number of spatial transmission layers one by one, starting from the pilot symbol for transmission at the first spatial transmission layer in the preset pilot symbol set of the UE.

10. The method according to claim 6, wherein, the method further comprises: obtaining a code word of the pilot symbol according to a mapping relationship between the pilot symbol and a code word; or receiving a code word of the pilot symbol, wherein the code word of the pilot symbol is sent by an eNodeB; and the obtaining the channel estimation value of the channel used by the UE according to the pilot symbol is: obtaining, the code word of the pilot symbol.

11. The method according to claim 6, wherein, the data information further comprises a current pilot-symbol use status of the communication system, wherein the current pilot-symbol use status of the communication system is used to estimate the channel estimation value of another matching UE or another interfering UE among the matching UEs except the UE; and the method further comprises: performing signal detection or interference suppression detection according to the channel estimation value of another matching UE or another interfering UE except the UE.

12. An apparatus for processing data sending, comprising:

an allocating module, configured to allocate a number of spatial transmission layers to a user equipment (UE) and a pilot symbol for transmission at the spatial transmission layers allocated to the UE;

a generating module, configured to determine pilot symbol information according to combination of information about the number of spatial transmission layers allocated to the UE and the pilot symbol for transmission at a spatial transmission layer allocated to the UE; and a sending module, configured to send, in a time-frequency domain to the UE, data information comprising the determined pilot symbol information, enabling the UE to obtain a channel estimation value according to the pilot symbol information.

13. The apparatus for processing data sending according to claim 12, wherein, the pilot symbol information comprises:

a pilot symbol of the UE for transmission at a first spatial transmission layer in the spatial transmission layers allocated to the UE, and a number of spatial transmission layers; or a pilot symbol of the UE for transmission at each spatial transmission layer allocated to the UE; or a pilot symbol of the UE for transmission at a first spatial transmission layer in the spatial transmission layers allocated to the UE.

14. The apparatus for processing data sending according to claim 13, wherein, the pilot symbol information further comprises a current pilot-symbol use status of a communication system and/or a use status of the pilot symbol for transmission at the spatial transmission layers.

15. The apparatus for processing data sending according to claim 14, wherein, the generating module comprises a first generating unit, wherein the first generating unit is configured to set the current pilot-symbol use status of the communication system corresponding to the number of spatial transmission layers and the use status of the pilot symbol for transmission at the spatial transmission layers allocated to the UE, combine a spatial transmission layer number, current pilot-symbol use status of the communication system, and
use status of the pilot symbol for transmission at the spatial transmission layers allocated to the UE, number the combination, and use the combination number as the pilot symbol information.

16. The apparatus for processing data sending according to claim 12, wherein, the allocating module comprises: a first allocating unit, configured to allocate a pilot symbol to a multiple user multiple input multiple output (MU-MIMO) UE on a same time-frequency resource element (RE); or
configured to allocate a code division orthogonal pilot symbol to a MU-MIMO UE on a same RE; or
configured to allocate pilot symbols with same overhead of time-frequency resource elements (RE) to a single user MIMO (SU-MIMO) UE and a MU-MIMO UE when the number of spatial transmission layers of a plurality of UEs are same.

17. An apparatus for processing data receiving, comprising:
a receiving module, configured to receive data information which comprises pilot symbol information of user equipment (UE);
a pilot symbol obtaining module, configured to determine a pilot symbol of the UE according to the pilot symbol information generated according to combination of information about a number of spatial transmission layers allocated to the UE and a pilot symbol for transmission at a spatial transmission layer allocated to the UE;
a first obtaining module, configured to obtain a channel estimation value of a channel used by the UE according to the determined pilot symbol; and
a second obtaining module, configured to obtain service data according to the data information and the channel estimation value.

18. The apparatus according to claim 17, wherein, the apparatus further comprises: a channel estimating module, configured to estimate a channel estimation value of another matching UE or another interfering UE among matching UEs except the UE; and
the second obtaining module obtains the service data according to $\hat{S}=G^H Y$,
wherein, $\hat{S}$ indicates the service data obtained by the UE through detection, Y indicates service data received by the UE according to the data information, and G indicates a processing vector of the UE;

$$G = \left( H_1 H_1^H + \sum_1 H_i H_i^H + \alpha I_N \right)^{-1} H_1,$$

wherein, $H_1$ indicates a channel estimation value of the UE, $H_i$ indicates the channel estimation value of another matching UE or another interfering UE among the matching UEs except the UE, $I_N$ indicates an N-dimension unit matrix, and $\alpha$ is a signal-to-noise ratio factor; $\alpha=P_n/P$, wherein $P_n$ indicates noise power, and P indicates transmit signal power of each spatial transmission layer before the UE pre-processes the data information.

19. The apparatus according to claim 17, wherein, the generated pilot symbol information comprises:
a pilot symbol of the UE for transmission at a first spatial transmission layer in the spatial transmission layers, and the number of spatial transmission layers; or a pilot symbol of the UE for transmission at the spatial transmission layers allocated to the UE; and
the pilot symbol obtaining module is configured to determine the pilot symbol of the UE directly according to the pilot symbol information.

20. The apparatus according to claim 17, wherein, the generated pilot symbol information comprises:
a pilot symbol of the UE for transmission at a first spatial transmission layer in the spatial transmission layers allocated to the UE; and
the pilot resource obtaining module determines the pilot symbol of the UE according to the number of spatial transmission layers and the pilot symbol for transmission at the first spatial transmission layer.

21. The apparatus according to claim 17, further comprising:
a storing module, configured to store a mapping relationship between a pilot symbol and a code word;
the first obtaining module obtains a code word of the pilot symbol according to the mapping relationship between the pilot symbol and the code word, and further obtains, according to the pilot symbol, the channel estimation value of the channel used by the UE; or
the receiving module is further configured to receive the code word of the pilot symbol, wherein the code word of the pilot symbol is sent by an eNodeB; and
the first obtaining module obtains, according to the pilot symbol, wherein the code word of the pilot symbol is sent by the eNodeB, the channel estimation value of the channel used by the UE.

* * * * *